United States Patent
Ellwood, III et al.

(10) Patent No.: US 10,495,144 B1
(45) Date of Patent: Dec. 3, 2019

(54) SINGLE-ROW BALL BEARING WITH INTEGRATED SQUEEZE-FILM DAMPER

(71) Applicant: BorgWarner Inc., Auburn Hills, MI (US)

(72) Inventors: Erwin Perry Ellwood, III, Candler, NC (US); Tim House, Mills River, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/989,921

(22) Filed: May 25, 2018

(51) Int. Cl.
| | |
|---|---|
| *F16C 27/04* | (2006.01) |
| *F16C 19/16* | (2006.01) |
| *F01D 25/16* | (2006.01) |
| *H02K 5/173* | (2006.01) |
| *F16C 33/58* | (2006.01) |
| *F16C 35/04* | (2006.01) |
| *F01D 25/24* | (2006.01) |

(52) U.S. Cl.
CPC .......... *F16C 27/045* (2013.01); *F01D 25/164* (2013.01); *F16C 19/16* (2013.01); *F16C 33/583* (2013.01); *H02K 5/1732* (2013.01); *F01D 25/243* (2013.01); *F16C 35/042* (2013.01); *F16C 2226/12* (2013.01); *F16C 2226/16* (2013.01); *F16C 2360/24* (2013.01)

(58) Field of Classification Search
CPC ........ F16C 19/16; F16C 19/28; F16C 27/045; F16C 33/583; F16C 33/30; F16C 33/6651; F16C 33/6659; F16C 35/042; F16C 35/061; F16C 2360/14; F16C 2360/24; F16C 2226/12; F16C 2226/16; F01D 25/125; F01D 25/164; F01D 25/243; F16F 15/0236; H02K 5/1732
USPC ......... 384/99, 215, 499, 504, 535, 564–565, 384/570, 581, 561, 585; 415/174.2, 229
See application file for complete search history.

(56) References Cited

U.S. PATENT DOCUMENTS

| | | | |
|---|---|---|---|
| 4,952,076 A * | 8/1990 | Wiley, III | F01D 25/164 384/535 |
| 6,325,546 B1 * | 12/2001 | Storace | F01D 21/04 384/536 |
| 6,540,483 B2 * | 4/2003 | Allmon | F01D 25/16 384/581 |

(Continued)

FOREIGN PATENT DOCUMENTS

| | | | | |
|---|---|---|---|---|
| CA | 2937018 A1 * | 3/2017 | ........... | F01D 25/164 |
| DE | 102010035665 A1 * | 3/2012 | ........... | F01D 25/164 |

(Continued)

*Primary Examiner* — Marcus Charles
(74) *Attorney, Agent, or Firm* — Miller, Matthias & Hull LLP

(57) ABSTRACT

In accordance with one aspect of the present disclosure, a rolling element bearing assembly is disclosed. The rolling element bearing assembly may be used in an electrically-assisted turbocharger. The bearing assembly includes an inner race having an outer diameter defining an inner raceway, an outer race having an outer diameter and an inner diameter, the outer-race inner diameter defining an outer raceway, a single row of rolling elements between the inner raceway and the outer raceway, and a squeeze-film damper integrated with the outer race to form a single component. The squeeze-film damper provides for a squeeze-film damper surface between the outer-race outer diameter and a housing.

12 Claims, 7 Drawing Sheets

(56) References Cited

U.S. PATENT DOCUMENTS

| | | | | |
|---|---|---|---|---|
| 7,478,952 B2* | 1/2009 | Faust | ...................... | F16C 27/04 |
| | | | | 384/535 |
| 7,699,526 B2* | 4/2010 | McMurray | .......... | F16F 15/0237 |
| | | | | 384/489 |
| 8,267,650 B2* | 9/2012 | Alam | .................... | F01D 25/164 |
| | | | | 415/229 |
| 8,727,632 B2* | 5/2014 | Do | ........................ | F01D 25/164 |
| | | | | 384/472 |
| 10,247,237 B2* | 4/2019 | Hwang | ................ | F16C 27/066 |
| 2007/0031078 A1* | 2/2007 | Hackett | ................ | F01D 25/164 |
| | | | | 384/535 |
| 2011/0305567 A1* | 12/2011 | Milfs | .................... | F01D 21/045 |
| | | | | 415/229 |
| 2012/0099811 A1* | 4/2012 | Ito | .......................... | F16C 35/04 |
| | | | | 384/448 |
| 2015/0078696 A1* | 3/2015 | Schmidt | ................ | F01D 25/125 |
| | | | | 384/504 |
| 2016/0177784 A1* | 6/2016 | Archer | .................... | F01D 25/16 |
| | | | | 415/170.1 |

FOREIGN PATENT DOCUMENTS

| | | | | |
|---|---|---|---|---|
| EP | 3073136 A1 * | 9/2016 | ............ | F16C 23/088 |
| EP | 3199840 A1 * | 8/2017 | ................ | F02C 7/36 |
| WO | WO-2014160851 A1 * | 10/2014 | .......... | F16C 33/6659 |

\* cited by examiner

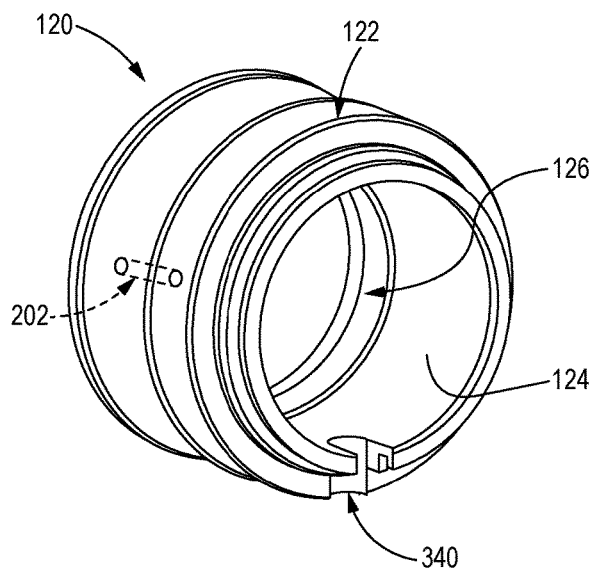
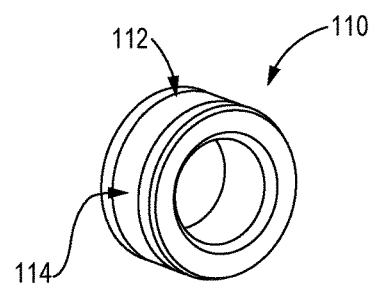
FIG. 3
FIG. 4
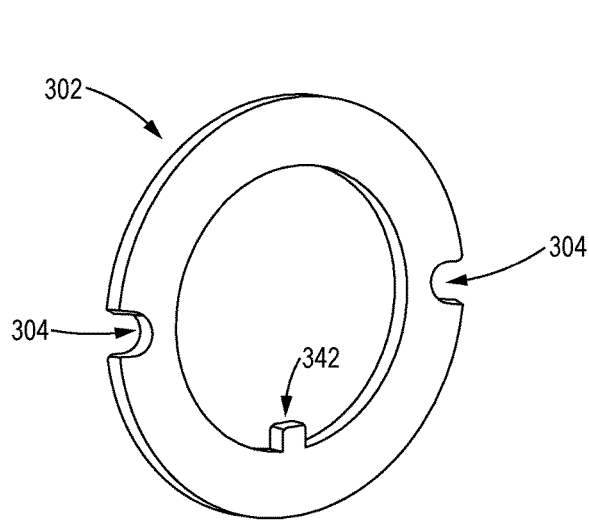
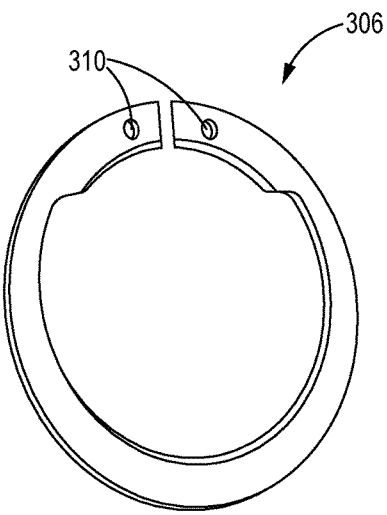
FIG. 5
FIG. 6

SINGLE-ROW BALL BEARING WITH INTEGRATED SQUEEZE-FILM DAMPER

TECHNICAL FIELD

The present disclosure generally relates to a bearings and more specifically relates to a method or apparatus of manufacturing bearings and bearing components for use in rotating machinery.

BACKGROUND

Rolling element bearings are frequently used in machines and devices with rotating parts. Typical rolling element bearings include inner and outer races, with balls—or rollers—disposed between the races.

High speed equipment, such as turbochargers, compressor turbines, and gas turbines utilize rolling element bearings around rotating shafts. In particular, turbochargers are used to enhance performance of internal combustion engines. While some turbochargers utilize exhaust gas for power, other turbochargers may also operate with an electronic motor operatively coupled to the shaft, either alone or assisted by exhaust gas, to power the turbocharger.

Turbochargers can rotate at speeds in excess of 100,000 rpm. Numerous enhancements have been made to increase their performance and longevity, particularly as related to issues of lubrication. For example, some turbocharger bearings incorporate damping characteristics to damp out vibrations and allow equipment to obtain safe operating speeds as they speed up through resonant regions. Further, dampened bearings also help damp out smaller vibrations introduced by imbalances as the machines operate at steady-state, or normal operating speeds.

U.S. Pat. No. 5,425,584 discloses a fluid dampened support for rolling element bearings. In the '584 patent, a network of closely spaced beams support an outer race of the roller bearing from movement in any direction. A liquid is provided in the spaces between the beams to dampen the movement. The structure and space between the beams is designed to provide damping characteristics. However, systems and methods are still needed in order to reduce part count, provide for easier assembly, and reduce tolerance stack-up of multiple components. As such, there is a need for a single-row ball bearing with an integrated squeeze-film damper.

SUMMARY

In accordance with one aspect of the present disclosure, a rolling element bearing assembly is disclosed. The rolling element bearing assembly may be used in an electrically-assisted turbocharger. The bearing assembly includes an inner race having an outer diameter defining an inner raceway, an outer race having an outer diameter and an inner diameter, the outer-race inner diameter defining an outer raceway, a single row of rolling elements between the inner raceway and the outer raceway, and a squeeze-film damper integrated with the outer race, forming a single component. The squeeze-film damper provides for a squeeze-film damper surface between the outer-race outer diameter and a housing.

In one such embodiment, the bearing assembly further includes an oil jet in the outer race. In another such embodiment, the bearing assembly includes an end-stop flange matable with the outer race and configured to engage with the housing. In such an embodiment, the end-stop flange may be rotationally constrained to the outer race and further includes an anti-rotation feature configured to engage with the housing. In one such embodiment, the end-stop flange is attached to the outer race via a snap ring.

In another embodiment, the bearing assembly includes an end-stop flange integrated with the outer race and configured to engage with the housing. In one such embodiment, the end-stop flange is further includes an anti-rotation feature configured to engage with the housing.

Another embodiment takes the form of an electrically-assisted turbocharger including a housing, a turbine wheel, a compressor wheel, a shaft supported in the housing and interconnecting the turbine wheel and the compressor wheel, an electric motor disposed in the housing and operatively coupled to the shaft, and at least one rolling element bearing assembly surrounding the shaft. The at least one rolling element bearing assembly includes an inner race, an outer race, a plurality of rolling elements between the inner race and the outer race, and a squeeze-film damper integrated into the outer race to provide a squeeze-film damper surface between an outer diameter of the outer race and the housing.

In one such embodiment, the turbocharger further includes an oil jet in the outer race. In another such embodiment, the turbocharger further includes an end-stop flange matable with the outer race and configured to engage with the housing. In such an embodiment the end-stop flange is rotationally constrained to the outer race and further comprises an anti-rotation feature configured to engage with the housing. In one such embodiment, the end-stop flange is attached to the outer race via a snap ring.

In another such embodiment, the turbocharger further includes an end-stop flange integrated with the outer race and is configured to engage with the housing. The end-stop flange may further include a pin aperture configured to engage with an anti-rotation pin.

Another embodiment takes the form of an electrically-assisted turbocharger having a housing, a turbine wheel, a compressor wheel, a shaft supported in the housing and interconnecting the turbine wheel and the compressor wheel, an electric motor disposed in the housing and operatively coupled to the shaft, a turbine-side rolling element bearing disposed about the shaft at a turbine-side of the electric motor, and a compressor-side rolling element bearing disposed about the shaft at a compressor-side of the electric motor.

At least one or both of the turbine-side rolling element bearing and the compressor-side rolling element bearing includes an inner race having an outer diameter defining an inner raceway, an outer race having an outer diameter, an inner diameter defining an outer raceway, and an oil jet configured to provide lubrication to the inner raceway, a single row of rolling elements between the inner raceway and the outer raceway, a squeeze-film damper integrated with the outer race to form a single component. The squeeze-film damper provides a squeeze-film damper surface between the outer-race outer diameter and the housing. An end-stop flange is matable with the outer race and is affixed to the outer race with a snap ring. The end-stop flange is rotationally constrained to the outer race and further engages with an anti-rotation feature of the housing.

Another embodiment takes the form of an electrically-driven compressor having a housing, at least one compressor wheel, a shaft supported in the housing and interconnected with the at least one compressor wheel, an electric motor disposed in the housing and operatively coupled to the shaft, and at least one compressor rolling element bearing disposed about the shaft at a compressor-side of the electric motor. In such an embodiment, the compressor-side rolling element bearing includes an inner race having an outer diameter defining an inner raceway, an outer race having an outer diameter and an inner diameter, and an oil jet configured to provide lubrication to the inner raceway, the outer-race inner diameter defining an outer raceway, a single row of rolling elements between the inner raceway and the outer raceway, a squeeze-film damper integrated with the outer race to form a single component, the squeeze-film damper providing a squeeze-film damper surface between the outer-race outer diameter and the housing, and an end-stop flange matable with the outer race and affixed to the outer race with a snap ring. The end-stop flange is rotationally constrained to the outer race and further engages with an anti-rotation feature of the housing.

These and other aspects and features of the present disclosure will be more readily understood when read in conjunction with the accompanying drawings.

BRIEF DESCRIPTION OF THE DRAWINGS

FIG. 3 depicts a perspective view of an outer race, in accordance with an embodiment of the present disclosure.

FIG. 4 depicts a perspective view of an inner race, in accordance with an embodiment of the present disclosure.

FIG. 5 depicts a perspective view of an end-stop flange, in accordance with an embodiment of the present disclosure.

FIG. 6 depicts a perspective view of a snap ring, in accordance with an embodiment of the present disclosure.

DETAILED DESCRIPTION

Figure 1:
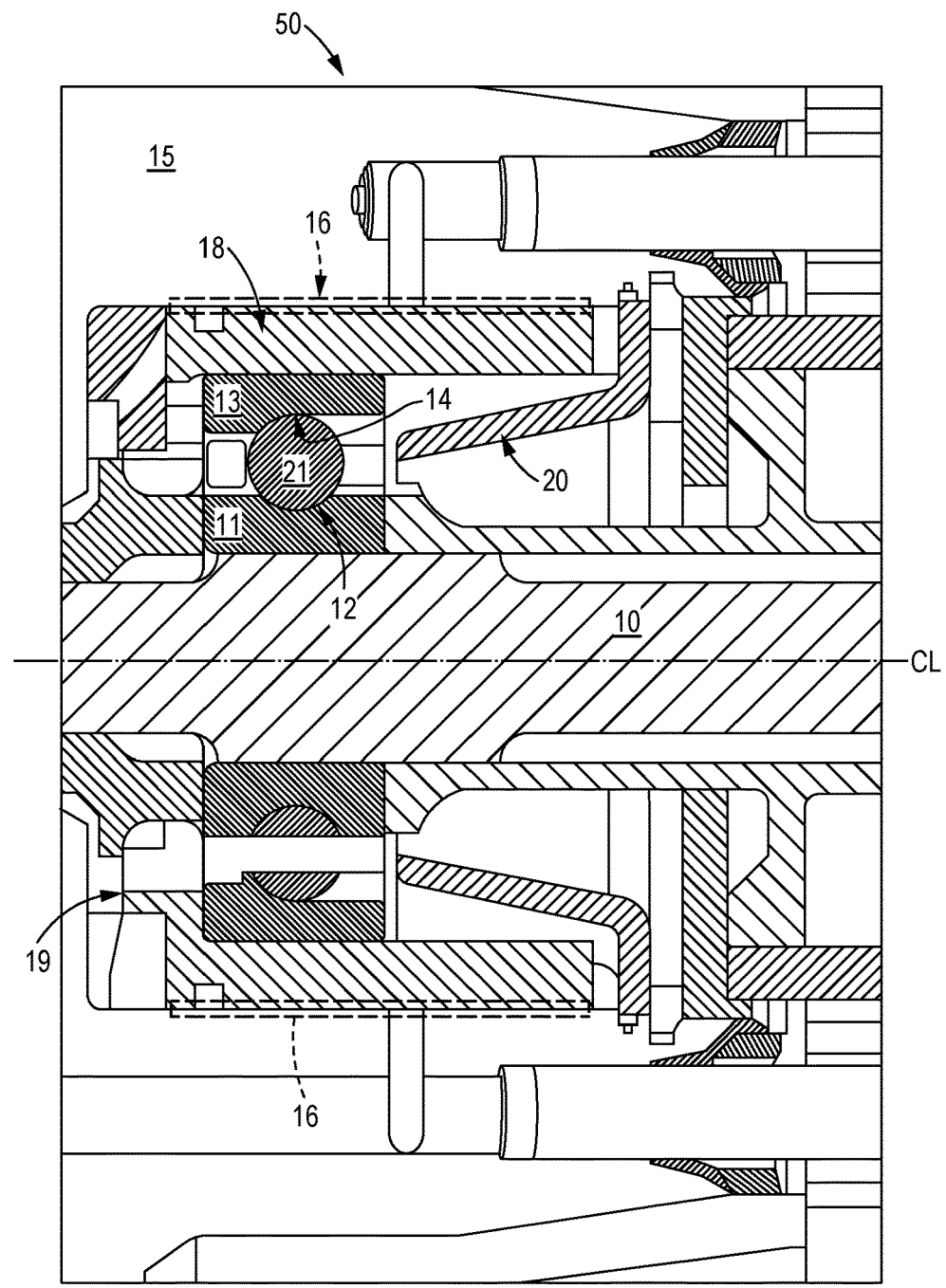
FIG. 1 depicts a cross-sectional view of a conventional turbocharger bearing assembly.

Referring now to the drawings, FIG. 1 depicts a cross-sectional view of a conventional turbocharger bearing assembly. In particular, FIG. 1 depicts the cross-sectional view 50 of a conventional turbocharger having a rolling element bearing. In the cross-sectional views contained herein, multiple components are depicted in both an upper and a lower portion of the views. For example, a ring-shaped outer race encircles a shaft, but in a cross-sectional taken along a centerline, appears both above and below the centerline. Throughout this disclosure, such components are not depicted and labeled on both halves of the centerline for clarity.

In the view 50, a shaft 10 is depicted as being supported by a bearing. The bearing is enclosed within a housing 15 and includes an inner race 11 having an inner raceway 12 along the inner-race outer diameter and an outer race 13 having an outer raceway 14 along the outer-race inner diameter. The rolling element 21 is disposed between the raceways 12, 24 of the inner race 11 and the outer race 13.

A bearing cup 18 interfaces with the outer race 13 via a tight clearance fit, an interference fit, or the like, to form a rigid connection between the outer race 13 and the bearing cup 18. In some embodiments, the inner and outer races are press fit into the bearing cup 18. The bearing cup 18 further includes an axial end stop 19 that interfaces with a portion of the housing 15 to limit translational movement of the bearing along the longitudinal axis CL along the centerline of the shaft 10. The bearing further includes an oil deflector 20 used to direct oil throughout the bearing.

A squeeze-film damper surface 16 is created between the bearing cup 18 and the housing 15. The squeeze-film damper surface 16 comprises a clearance having a dimension that is tuned to optimize oil film thickness, and as a result the damping characteristics, of the bearing assembly. As a result of multiple components each having individual manufacturing tolerances, optimizing the clearance dimension for the squeeze-film damper surface 16 may become challenging in a conventional design of a rolling element bearing.

Figure 2:
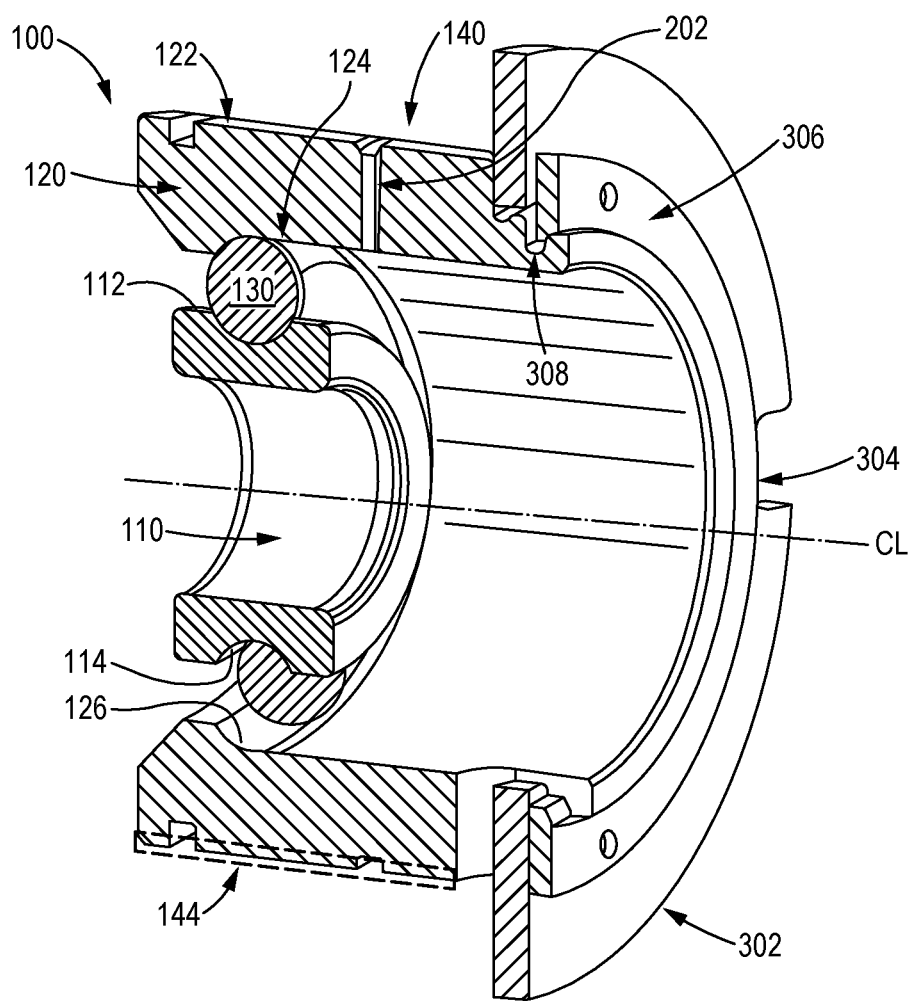
FIG. 2 depicts a sectioned view of a first bearing assembly, in accordance with an embodiment of the present disclosure.

FIG. 2 depicts a sectioned view of a first bearing assembly, in accordance with an embodiment of the present disclosure. In particular, FIG. 2 depicts a view of the bearing assembly 100. The bearing assembly 100 may be used in any applicable rotating machinery. Example machines include turbochargers, electric turbochargers (e.g., eTurbos), electrically-assisted turbochargers, gas turbines, and the like. The bearing assembly 100 includes an inner race 110 (also shown separated from the other bearing assembly components in FIG. 4) that has an outer diameter 112 defining an inner raceway 114 and an outer race 120 (also shown separated from the other bearing assembly components in FIG. 3) that has both an outer diameter 122 and an inner diameter 124, with the outer-race inner diameter 124 defining an outer raceway 126.

A single row of rolling elements 130 is disposed between the inner raceway 114 and the outer raceway 126. The rolling elements 130 are appropriately sized to fit between the raceways 114, 126 and provide for solid metal-to-metal contact between the inner and outer races 110, 120. A squeeze-film damper 140 is integrated into outer race 120, forming a single component. The squeeze-film damper 140 provides for a squeeze-film damper surface 144 between the outer-race outer diameter 122 and the housing 142 (not-pictured in FIG. 1). The squeeze-film damper surface 144 provides for an appropriate clearance between the squeeze-film damper 140 and the housing 142 to appropriately dampen the vibrations experienced by the bearing assembly.

In one embodiment, the bearing assembly 100 further includes an oil jet 202 in the outer race 120. The oil jet 202 provides for oil flow from the inner diameter 124 of the outer race 120 to the outer diameter 122 of the outer race 120. The oil jet 202 may be formed in the outer race 120 by any number of ways, to include being a feature of an injection mold of the outer race 120, machining or drilling a hole in the outer race 120, or the like. Further, the location of the oil jet 202 may be placed in various positions along the outer-race. For example, the oil jet 202 may be placed at either a top or a bottom-position of the outer race 120.

The outer race 120 may include a plurality of oil jets 202 circumferentially disposed along a circumference of the outer race 120. For example, three oil jets 202 may be disposed along the circumference of the outer race, spaced 120° apart from each other. Although any number of oil jets 202 may be used.

In one embodiment, the bearing assembly 100 further includes an end-stop flange 302 (also shown separated from the other bearing assembly components in FIG. 5) that is matable with the outer race 120. The end-stop flange 302 is configured to engage with, or abut against, the housing 142. The end-stop flange 302 may include a tab 342 configured to be inserted into a slot 340 on the outer race 120. Inserting the tab 342 into the slot 340 maintains rotational alignment about the axis CL between the outer race 120 and the end-stop flange 302 (e.g., rotationally constrains the outer race 120 to the end-stop flange 302). In another embodiment, the end-stop flange further includes an anti-rotation feature 304 configured to engage with the housing 142. For example, the anti-rotation feature 304 may include pin apertures configured to receive anti-rotation pins on the housing. When the anti-rotation pins (not depicted) are inserted into the anti-rotation feature 304, the end-stop flange 302 is rotationally constrained to the housing 142.

Some embodiments combine an end-stop flange 302 having both the tab 342 and slot 340 along with the anti-rotation feature 304. In such an embodiment, when the anti-rotation feature 304 is engaged with the end-stop flange 302, both the outer race 120 and the end-stop flange 302 are prohibited from rotating about the CL axis due in part from the anti-rotation feature of the outer race 120 being engaged with the housing 142 and the tab 342 of the end-stop flange 302 being installed into the slot 340 of the outer race 120. In various embodiments, engaging the anti-rotation feature 304 comprises anti-rotation pins of the housing being inserted into the anti-rotation feature 304.

Also depicted in the bearing assembly 100 is a snap ring 306. The snap ring 306 is sized to fit within the groove 308 and constrain the end-stop flange 302 from translating along the axis CL.

FIG. 3 depicts a perspective view of an outer race, in accordance with an embodiment of the present disclosure. The outer race 120 depicted in FIG. 3 more clearly depicts the aspects of the outer race 120 depicted in FIG. 2. In particular, the outer race 120 of FIG. 3 depicts the slot 340 that is configured to align with the tab 342 of the end-stop flange 302.

Also depicted is the oil jet 202, extending from the outer circumference of the outer race 120 to the inner circumference of the outer race 120.

FIG. 4 depicts a perspective view of an inner race, in accordance with an embodiment of the present disclosure. The inner race 110 depicted in FIG. 4 more clearly depicts the aspects of the inner race depicted in FIG. 2.

FIG. 5 depicts a perspective view of an end-stop flange, in accordance with an embodiment of the present disclosure. The end-stop flange 302 depicted in FIG. 5 more clearly depicts the aspects of the end-stop flange depicted in FIG. 2. In particular, the end-stop flange 302 includes the anti-rotation features 304, located along the outer circumference of the end-stop flange 302. As depicted, the anti-rotation feature 304 is realized as two apertures located at opposing sides along the outer circumference of the end-stop flange 302. In some embodiments, a different number of apertures are disposed along the outer circumference of the end-stop flange 302. The end-stop flange 302 in FIG. 5 also depicts the tab 342 that aligns with the slot 340. It should be noted that the tab 342 and slot 340 may switch locations, with the slot being positioned on the end-stop flange 302 and the tab 342 being positioned on the outer race 120.

FIG. 6 depicts a perspective view of a snap ring, in accordance with an embodiment of the present disclosure. The snap ring 306 is depicted as a circular shape having an expansion break at the top, with eyeholes 310 located in proximity to the expansion break.

Figure 7:
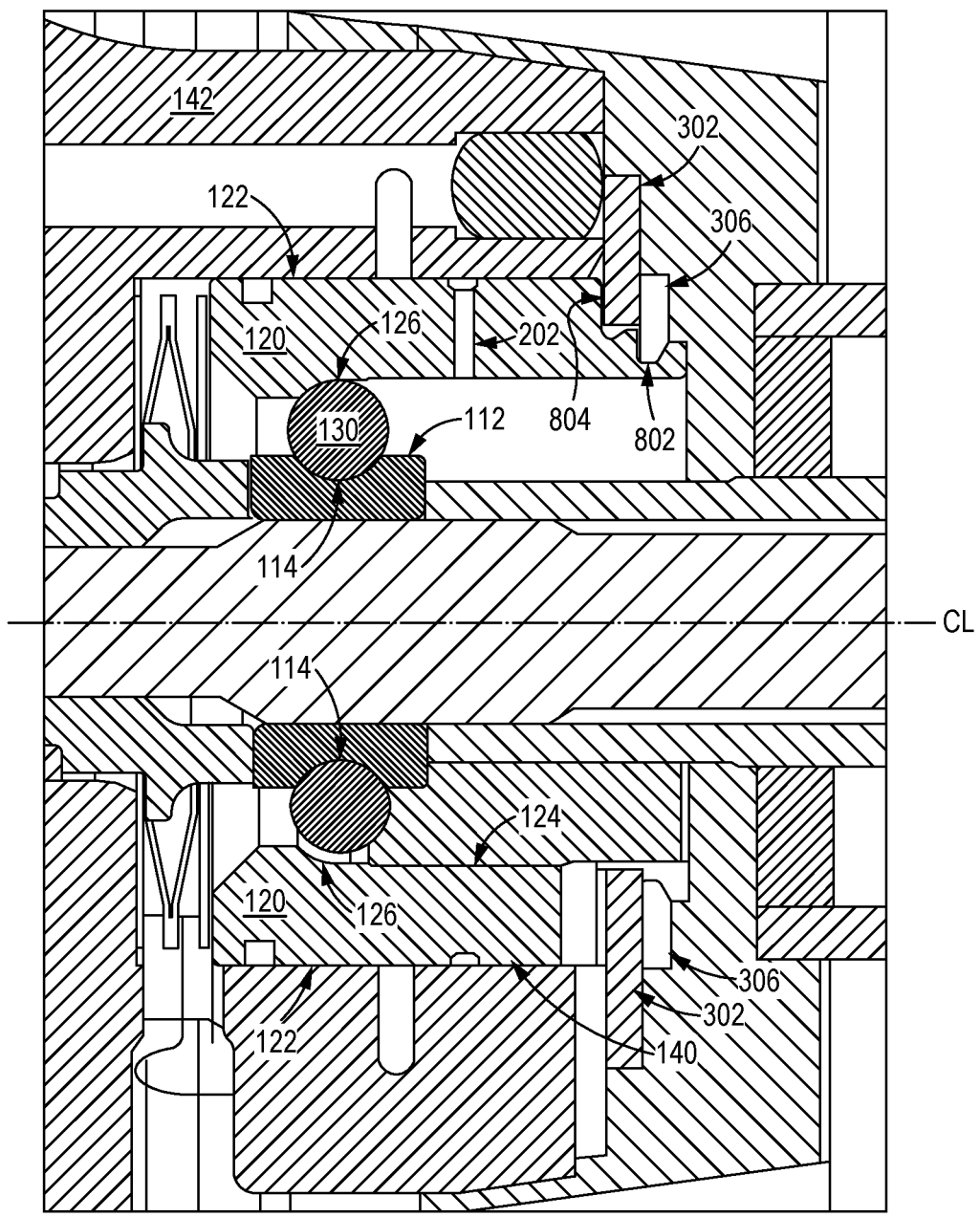
FIG. 7 depicts a cross-sectional view of a bearing assembly installed in a turbocharger, in accordance with an embodiment of the present disclosure.

FIG. 7 depicts a cross-sectional view of a bearing assembly installed in a turbocharger, in accordance with an embodiment of the present disclosure. In particular, FIG. 7 depicts a cross-sectional view of the bearing assembly depicted in FIG. 2. As depicted in FIG. 7, the end-stop flange 302 is attached to the outer race 120 via a snap ring 306. The snap ring 306 (also shown separated from the other bearing assembly components in FIG. 6) is sized to fit within a groove 802 on the outer race 120.

Installation of the end-stop flange 302 and the snap ring 306 onto the outer race 120 may be achieved by aligning the tab 342 of the end-stop flange 302 with the slot 340 of the outer race 120 such that the outer race 120 abuts against the end-stop flange 302 at contact point 804. The snap ring 306 may be expanded by prying apart the eyeholes 310. The snap ring 306 may then be positioned into the groove 802 of the end-stop flange 302. The snap ring 306 may then be restored to its nominal geometry by allowing the eyeholes 310 to return to their nominal, non-pried apart, position. Thus, the snap ring 306 is constrained within the groove 802. Further, the end-stop flange 302 is constrained from translating along the axis CL on one side at the contact point 804 on the outer race 120 and by the snap ring 306 on an opposing side.

Figure 8:
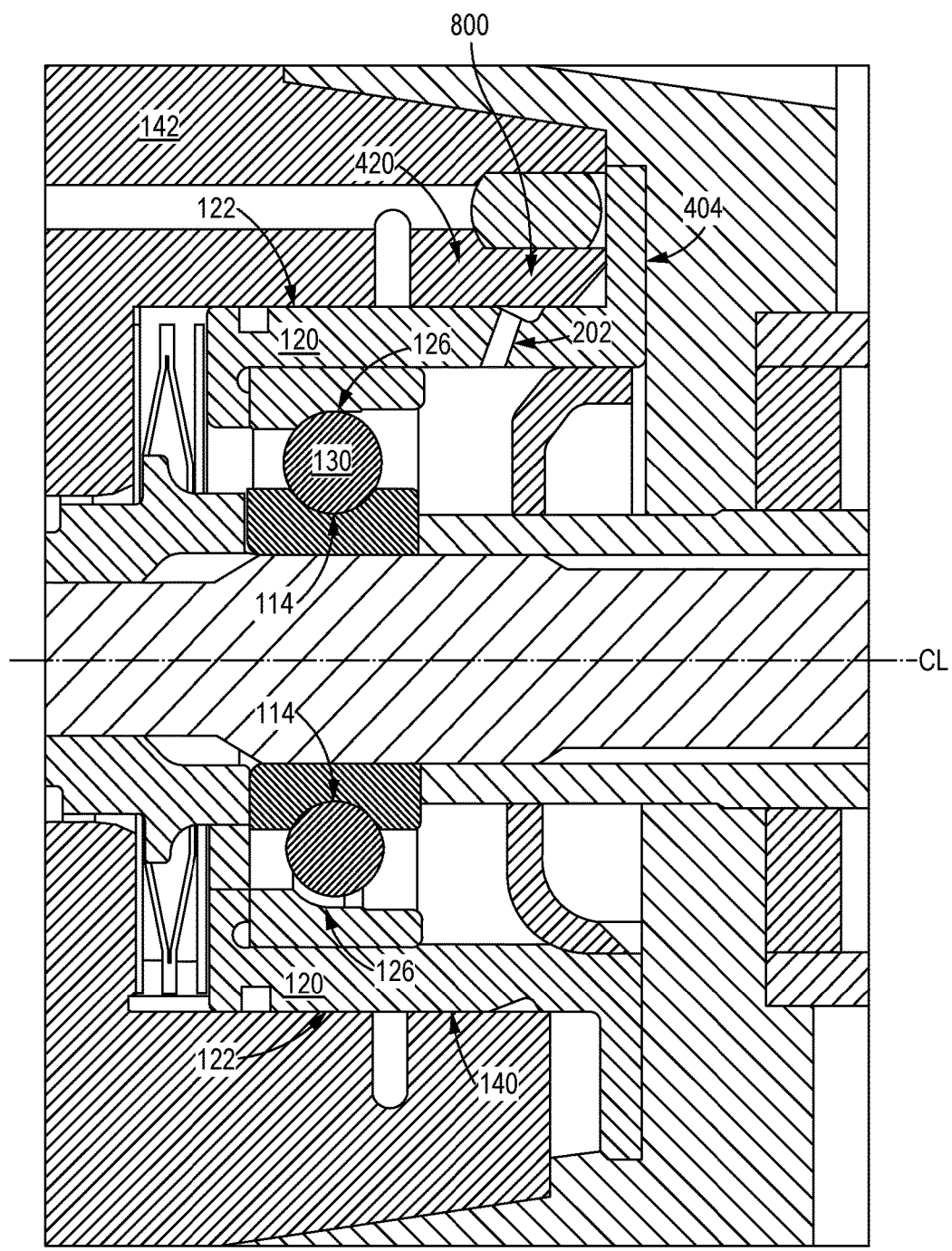
FIG. 8 depicts a cross-sectional view of a second bearing assembly, in accordance with an embodiment of the present disclosure.

FIG. 8 depicts a cross-sectional view of a second bearing assembly, in accordance with an embodiment of the present disclosure. In particular, FIG. 8 depicts bearing assembly 800 installed into a housing 142 and includes many of the same components as the bearing assembly depicted in FIGS. 2 and 7. However, in FIG. 8, the end-stop flange 404 is integrated with the outer race 120 to form a single component 420. This is opposed to the outer race and end-stop flange being separate components as depicted in FIGS. 2 and 7.

As such, the end-stop flange 404 may comprise similar components as the end-stop flange 302. In one such embodiment, the end-stop flange 404 includes an anti-rotation feature (e.g., such as the anti-rotation feature 304) that is configured to engage with the housing 142. Thus, when the anti-rotation feature (e.g., 304) is engaged with the housing 142, the integrated outer race 120 and end-stop flange 404, together as a single component 420, are rotationally constrained with the housing 142.

INDUSTRIAL APPLICABILITY

In general, the teachings of the present disclosure may find broad applicability in many industries including, but not limited to, automotive, single-track vehicle, marine, electronic, and transportation industries. In particular, the present disclosure may find applicability in any industry using machines or equipment that include rotating components. Disclosed herein are various non-limiting examples of machinery that may include the rolling element bearing assemblies of the disclosure.

Figure 9:
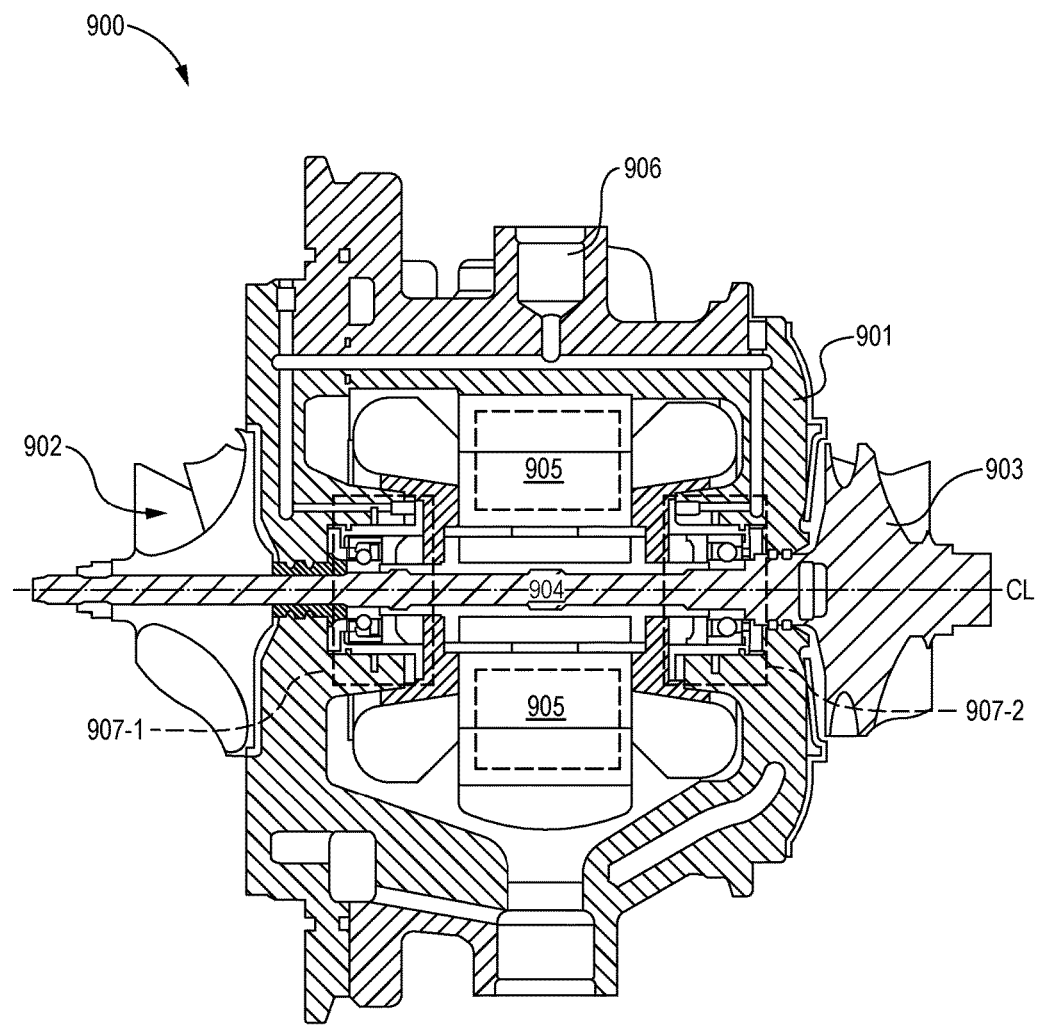
FIG. 9 depicts a cross-sectional view of a turbocharger, in accordance with an embodiment of the present disclosure.

FIG. 9 depicts a cross-sectional view of a turbocharger, in accordance with an embodiment of the present disclosure. In particular, FIG. 9 depicts an electrically-assisted turbocharger 900. The turbocharger 900 includes a housing 901, a turbine wheel 902, a compressor wheel 903, a shaft 904 supported in the housing 901 and interconnecting the turbine wheel 902 and the compressor wheel 903, an electric motor 905 disposed in the housing 901 and operatively coupled to the shaft 904, an oil supply system 906, and at least one rolling element bearing assembly 907 supporting the shaft 904.

In such an embodiment, the electric motor 905 is disposed between a first end (e.g., the turbine end on the left) and a second end (e.g., the compressor end on the right). As such, multiple bearing assemblies 907 may be used to support the shaft 904 on each side of the electric motor 905. Here, the bearing assembly 907-1 is depicted on the turbine-side of the electric motor 905 and the bearing assembly 907-2 is depicted on the compressor-side of the electric motor 905.

The electric motor 905 may be operably coupled to the shaft 904 to provide rotational force to the shaft 904, and thus drive rotation of the turbine and compressor wheels 902, 903, in a variety of ways. For example, the electric motor 905 may be mounted outside of the turbocharger 900 and connect to a nose of the compressor wheel via a splined coupler. The electric motor 905 may further act on the shaft via magnetic forces to provide the desired rotational effect.

The at least one rolling element bearing assembly 907-1, 907-2 may be realized by either the bearing assembly 100 depicted in FIGS. 2 and 7, or by the bearing assembly 800 depicted in FIG. 8. As such, the bearing assembly includes an inner race 110, an outer race 120, a plurality of rolling elements 130 between the inner race 110 and the outer race 120, and a squeeze-film damper 140 integrated into the outer race 120 to provide a squeeze-film damper surface 144 between the outer diameter 122 of the outer race 120 and the housing 901.

In one such embodiment, the bearing assembly 907-1, 907-2 of the turbocharger 900 further includes an oil jet 202 in the outer race 120 fluidly connected to the oil supply system 906.

Figure 10:
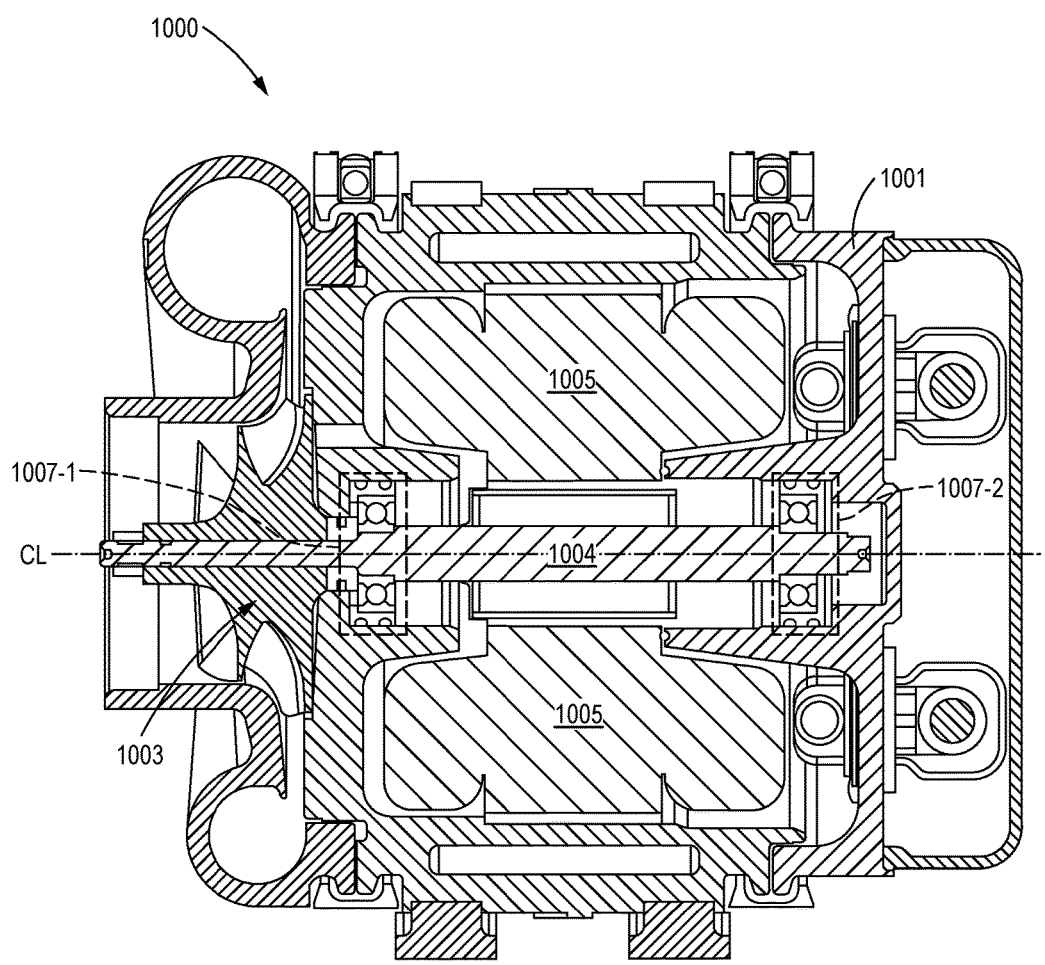
FIG. 10 depicts an electric compressor having a bearing assembly, in accordance with an embodiment of the present disclosure.

FIG. 10 depicts an electric compressor, in accordance with an embodiment of the present disclosure of the present disclosure. In particular, FIG. 10 depicts the compressor 1000 that includes a housing 1001, a compressor wheel 1003 operatively coupled to the shaft 1004, an electric motor 1005 operatively coupled to the shaft, and the bearing assemblies 1007-1 and 1007-2. Here, like the turbocharger 900, either one or both of the bearing assemblies 1007-1, 1007-2 may be realized by either of the bearing assemblies 100 or 800 disclosed herein. However, unlike the turbocharger 900, the compressor 1000 includes the compressor wheel 1003 on one end and no turbine wheel. As such, the shaft 1004 is operated on by the electric motor 1005 and the bearing assemblies 1007-1 and 1007-2 are disposed on either side of the electric motor 1005. The bearing assembly 1007-1 (e.g., the compressor-side bearing assembly) is located on a compressor side of the electric motor 1005 and the bearing assembly 1007-2 (e.g., a second bearing assembly) is located on a side of the electric motor 1005 that is opposite of the compressor wheel 1003.

In yet another embodiment, a dual-stage electric compressor may utilize the bearing assemblies disclosed herein. Such a machine may be similar to the turbocharger 900, but may comprise two compressor wheels on opposing sides of an electric motor and no turbine wheel.

Another embodiment takes the form of an electrically-driven compressor that includes a housing, at least one compressor wheel, a shaft supported in the housing and interconnected with the at least one compressor wheel, an electric motor disposed in the housing and operatively coupled to the shaft, and at least one compressor rolling element bearing disposed about the shaft at a compressor-side of the electric motor. In such an embodiment, the compressor-side rolling element bearing includes an inner race 110 having an outer diameter defining an inner raceway 114, an outer race 120 having an outer diameter and an inner diameter 124, and an oil jet 202 configured to provide lubrication to the inner raceway 114, the outer-race inner diameter 124 defining an outer raceway 126, a single row of rolling elements 130 between the inner raceway 114 and the outer raceway 126, a squeeze-film damper 140 integrated with the outer race 120 to form a single component, the squeeze-film damper 140 providing a squeeze-film damper surface 144 between the outer-race outer diameter and the housing, and an end-stop flange matable with the outer race 120 and affixed to the outer race 120 with a snap ring. The end-stop flange is rotationally constrained to the outer race 120 and further engages with an anti-rotation feature of the housing.

While the forgoing detailed description has been provided with respect to certain specific embodiments, it is to be understood the scope of the disclosure should not be limited to such embodiments. The breadth and spirit of the present disclosure is broader than the embodiments specifically disclosed and encompassed within the following claims.

Moreover, while some features are described in conjunction with certain specific embodiments, these features are not limited to use with only the embodiment with which they are described. Rather, aspects of the specific embodiments can be combined with or substituted by other features disclosed on conjunction with alternate embodiments.

What is claimed:

1. A rolling element bearing assembly for an electrically-assisted turbocharger, the bearing assembly comprising:
   an inner race having an outer diameter defining an inner raceway;
   an outer race having an outer diameter and an inner diameter, the outer-race inner diameter defining an outer raceway;
   a single row of rolling elements between the inner raceway and the outer raceway;
   a squeeze-film damper integrated with the outer race to form a single component, the squeeze-film damper providing a squeeze-film damper surface between the outer-race outer diameter and a housing; and
   wherein the outer race has an integral end stop flange forming a single component therewith, the end stop flange defining a radially extending contiguous boundary of the squeeze-film damper surface.

2. The bearing assembly of claim 1, further comprising an oil jet in the outer race.

3. The bearing assembly of claim 1, wherein the end-stop flange is configured to engage with the housing.

4. The bearing assembly of claim 3, wherein the end-stop flange comprises an anti-rotation feature configured to engage with the housing.

5. An electrically-assisted turbocharger, comprising:
   a housing;
   a turbine wheel;
   a compressor wheel;
   a shaft supported in the housing and interconnecting the turbine wheel and the compressor wheel;
   an electric motor disposed in the housing and operatively coupled to the shaft; and
   at least one rolling element bearing assembly surrounding the shaft, the at least one rolling element bearing assembly comprising:
   an inner race;
   an outer race;
   a plurality of rolling elements between the inner race and the outer race;
   a squeeze-film damper integrated into the outer race to provide a squeeze-film damper surface between an outer diameter of the outer race and the housing; and
   wherein the outer race has an integral end stop flange forming a single component therewith, the end stop flange defining a radially extending contiguous boundary of the squeeze-film damper surface.

6. The turbocharger of claim 5, further comprising an oil jet in the outer race.

7. The turbocharger of claim 5, wherein the end-stop flange is configured to engage with the housing.

8. The turbocharger of claim 7, wherein the end-stop flange comprises an anti-rotation feature configured to engage with the housing.

9. The turbocharger of claim 8, wherein the anti-rotation feature of the end-stop flange comprises a pin aperture configured to engage with an anti-rotation pin.

10. An electrically assisted compressor comprising:
a housing;
at least one compressor wheel;
a shaft supported in the housing interconnected with the at least one compressor wheel;
an electric motor disposed in the housing and operatively coupled to the shaft; and
a compressor-side rolling element bearing disposed about the shaft at a compressor-side of the electric motor, the compressor-side rolling element bearing comprises:
a first inner race having a first outer diameter defining a first inner raceway;
a first outer race having a first outer diameter, a first inner diameter defining a first outer raceway, and a first oil jet configured to provide lubrication to the first inner raceway;
a first single row of rolling elements between the first inner raceway and the first outer raceway;
a first squeeze-film damper integrated with the first outer race to form a first single component, the first squeeze-film damper providing a first squeeze-film damper surface between the first outer-race outer diameter and the housing; and
wherein the first outer race has an integral end stop flange forming a single component therewith, the end stop flange defining a radially extending contiguous boundary of the squeeze-film damper surface.

11. The compressor of claim 10, wherein the end-stop flange further comprises an anti-rotation feature configured to engage with the housing.

12. The compressor of claim 10, further comprising a second rolling element bearing disposed about the shaft at a side of the electric motor opposing the compressor-side rolling element bearing, the second rolling element bearing comprises:
a second inner race having a second outer diameter defining a second inner raceway;
a second outer race having a second outer diameter, a second inner diameter defining a second outer raceway, and a second oil jet configured to provide lubrication to the second inner raceway;
a second single row of rolling elements between the second inner raceway and the second outer raceway; and
a second squeeze-film damper integrated with the second outer race to form a second single component, the second squeeze-film damper providing a second squeeze-film damper surface between the second outer-race outer diameter and the housing.

\* \* \* \* \*